United States Patent [19]

Muramatsu

[11] Patent Number: 4,479,154
[45] Date of Patent: Oct. 23, 1984

[54] FLOPPY DISK DRIVE WITH LOCAL PROCESSOR CONTROL

[75] Inventor: Kikuo Muramatsu, Hyogo, Japan
[73] Assignee: Mitsubishi Denki Kabushiki Kaisha, Tokyo, Japan
[21] Appl. No.: 360,875
[22] Filed: Mar. 22, 1982
[30] Foreign Application Priority Data Mar. 23, 1981 [JP] Japan .................................. 56-42787

[51] Int. Cl.$^3$ ............................................. G11B 31/00
[52] U.S. Cl. ..................................................... 360/69
[58] Field of Search ..................... 360/69, 137; 369/53, 369/292

[56] References Cited

FOREIGN PATENT DOCUMENTS 55-64660  5/1980  Japan ..................................... 360/69

OTHER PUBLICATIONS

IEEE Transactions on Magnetics, vol. MAG-14, No. 4, Jul. 1978, pp. 203-206, Microprocessor Applications in Disk Storage Systems, D. Johann.
Electronic Design, vol. 28, No. 22, Oct. 25, 1980, pp. 111-115, Controller for Hard Disks Handles Four Drives at Once, J. Jaworski.
Electronics, vol. 53, No. 10, Apr. 24, 1980, p. 208, Controller Handles Floppies, Fixed Disks B. Le Boss.
IBM Technical Disclosure Bulletin, vol. 22, No. 11, Apr. 1980, Control Interface for Magnetic Disk Drive, pp. 5033-5035, G. Dix et al.
IBM Technical Disclosure Bulletin, vol. 21, No. 1, Jun. 1978, Automatic Access Calibration of a Direct-Access Storage Device, J. Boscove et al., pp. 27-28.

*Primary Examiner*—George G. Stellar
*Attorney, Agent, or Firm*—Sughrue, Mion, Zinn, Macpeak and Seas

[57] ABSTRACT

A disk driving mechanism is provided with a program memory section storing programs corresponding to a plurality of operational modes of the device and a mode set switch for applying an operational mode to an input/output section of the device. A central processing unit is provided for recognizing the operational mode set by said mode set switch, and for operating the device according to a program read out of the program memory corresponding to the selected operational mode. According to the invention, a floppy or hard disk drive may be operated by itself, without the aid of a host computer, for the purpose of self-diagnosis.

4 Claims, 4 Drawing Figures

FLOPPY DISK DRIVE WITH LOCAL PROCESSOR CONTROL

BACKGROUND OF THE INVENTION

This invention relates to a disk drive which is employed as an external memory means of a computer or the like.

A floppy disk drive (hereinafter referred to merely as "an FDD" when applicable) includes various components which are surrounded by the dotted line in FIG. 1. More specifically, in FIG. 1, reference numeral 1 designates a host computer which uses the FDD as an external memory device; 2, a floppy disk which is inserted in the FDD and can store data; 3, a floppy disk drive motor for turning the floppy disk with a stable speed; 4, a head for reading data off of the floppy disk and for writing data on the latter; 5, a step motor for moving the head 4 radially of the floppy disk 2; 6, a head load actuator for loading the head on and unloading the floppy disk 2, the step motor 5 and the head load actuator 6 forming a head positioning mechanism; and 7, and electronic control section for applying control signals to the head positioning mechanism.

FIG. 2 shows the above-described electronic control section 7 in more detail. In FIG. 2, reference character 7a designates a data read circuit; 7b, a data write circuit, these circuits 7a and 7b being connected directly to the head 4, the circuit 7b being further connected to a write protect detector 9; 7c, a step motor control section for driving the step motor 5; 7d, a head load control section for driving the head load actuator 6; 7e, a door lock control section for driving a door lock actuator 8; and 7f, a position confirming section for confirming, under host computer control, signals from a track "00" signal detector 10 and an index signal detector 11.

The operation of the FDD will be described with reference to FIG. 1.

The floppy disk 2 is turned at a constant speed by the floppy disk drive motor 3. When the host computer 1 writes data in the FDD or reads data out of the latter, the host computer 1 first applies a control signal to the FDD. According to the control signal, the electronic control section 7 moves the head 4 to a position on the floppy disk 2 where data is to be written or read, and then operates the head actuator 6 so that the head 4 is brought into contact with the floppy disk 2. Thereafter, the host computer 1 writes data onto the floppy disk or reads data from the floppy disk magnetically through the head 4 with the aid of the electronic control section 7.

The operation of the conventional electronic control section 7 (surrounded by the dotted line) will be described with reference to FIG. 2. The read circuit 7a shapes the waveform of an electric signal from the head 4 into a desired form irrespective of the track position of the head 4, so as to facilitate data reading by the host computer 1. The data write circuit 7b is an interface circuit which applies write data from the host computer 1 to the head 4. The data write circuit 7b has the function of inhibiting writing when the write protect detector 9 detects a write protect signal.

In the step motor control section 7c, a control signal from the host computer 1 is converted into a phase signal which can directly drive the step motor 5. According to a control signal from the host computer 1 and the state of the FDD, the head load control section 7d applies a signal to the head load actuator 6, to control the vertical movement of the head. Similarly, according to a control signal from the host computer 1 and the state of the FDD, the door control section applies a signal to the door lock actuator, to control the door lock. The position confirming section 7f confirms the relative position of the floppy disk 2, which is a magnetic recording medium, and the head 4 and accordingly informs the host computer.

The blocks 7a through 7f are connected to one another through logic circuits. When it is required to change the operation mode of the FDD depending upon the use thereof, the operator must disconnect or connect the interval wiring in the electronic control section 7.

Thus, even when the method of operating the conventional FDD is changed only slightly (or the operation mode is changed), several circuits must first be disconnected or connected. This preliminary work is troublesome. The FDD cannot operate the head by itself. Therefore, even a simple test of the FDD must be carried out with the aid of the FDD controller (or the host computer).

SUMMARY OF THE INVENTION

Accordingly, the invention is intended to eliminate the above-described difficulties accompanying a conventional FDD. More specifically, an object of the invention is to provide an FDD in which the electronic control section is composed of a stored program system controller, so that the operation mode can be readily switched and self-diagnosis can be carried out.

DETAILED DESCRIPTION OF THE PREFERRED EMBODIMENT

One embodiment of the invention will be described with reference to FIGS. 3 and 4.

Figure 1:
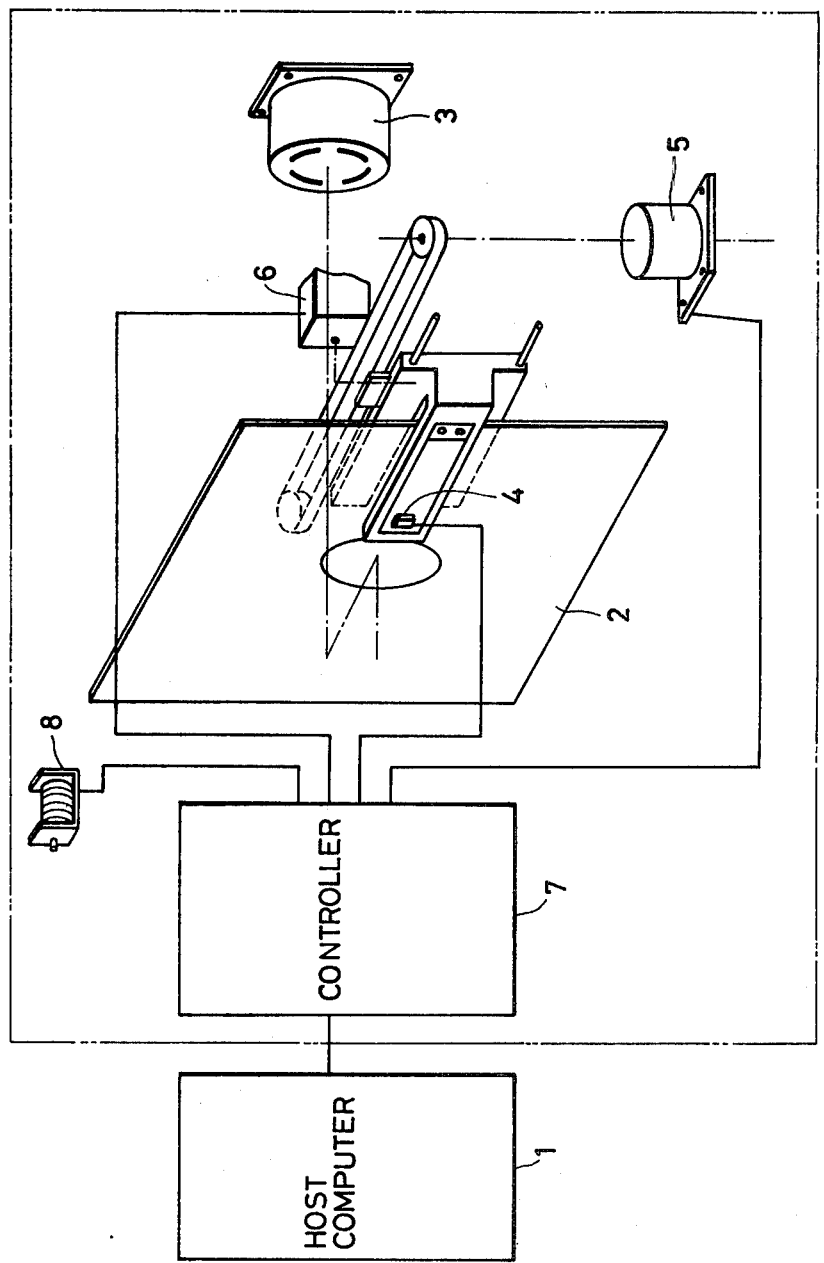
FIG. 1 is a schematic diagram showing the internal arrangement of a conventional FDD.
Figure 2:
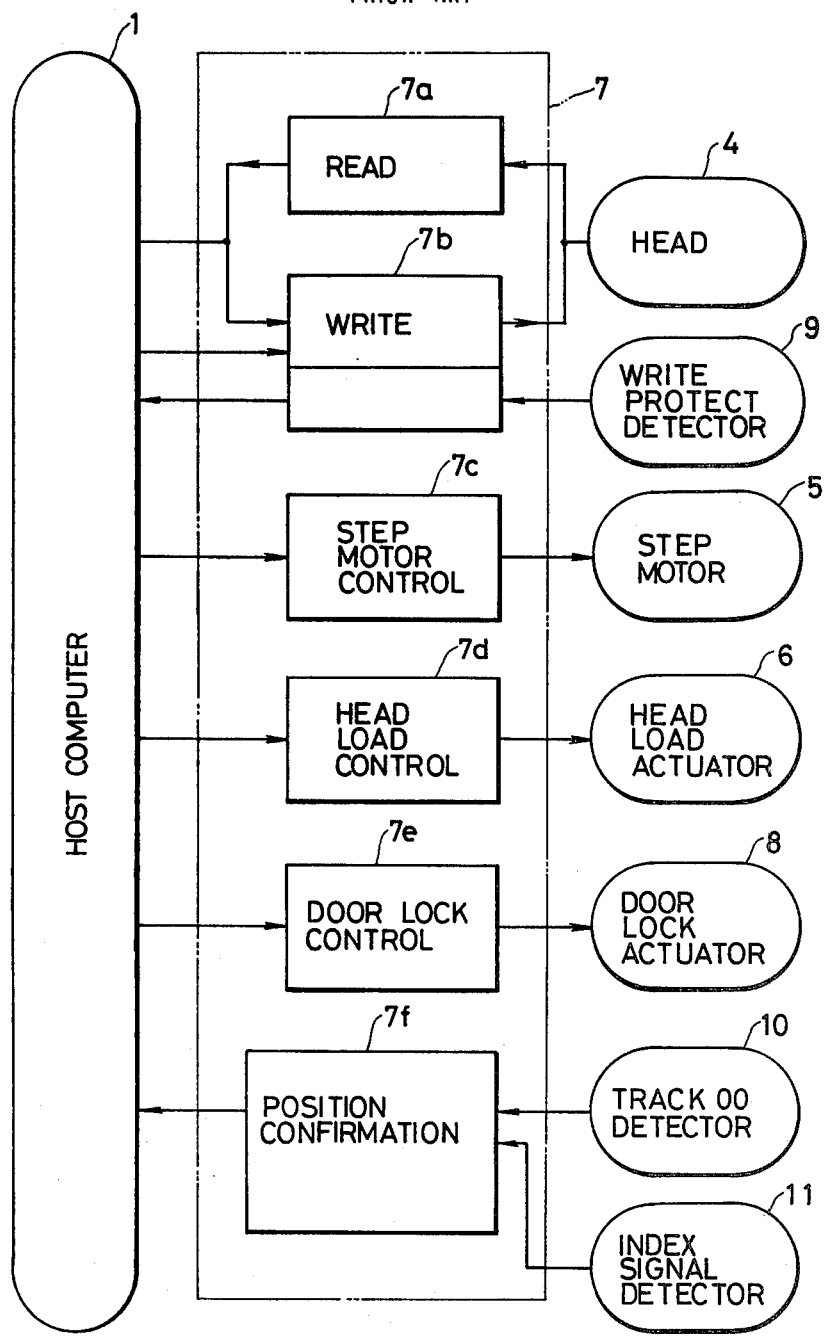
FIG. 2 is a block diagram of the conventional electronic control section shown in FIG. 1.
Figure 3:
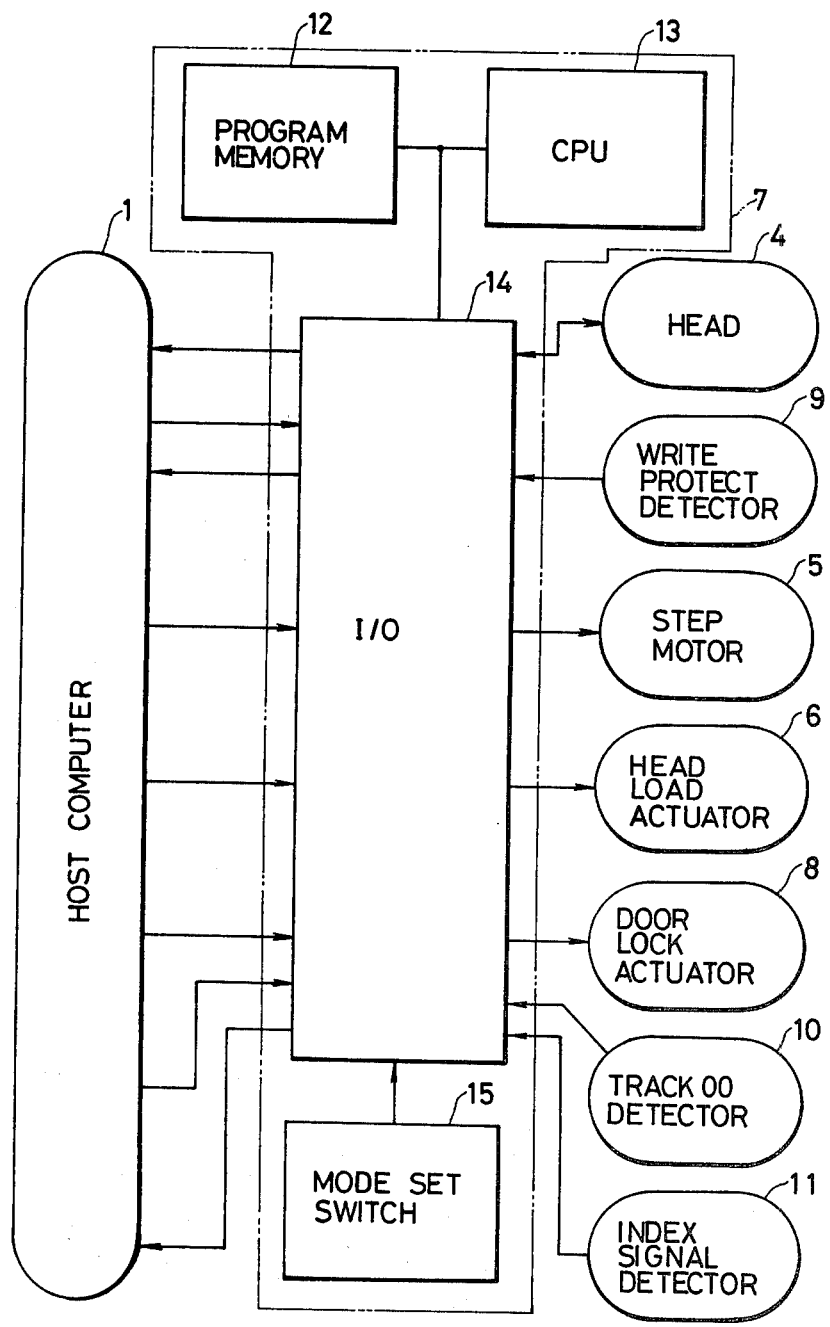
FIG. 3 is a block diagram illustrating one embodiment of the present invention.
Figure 4:
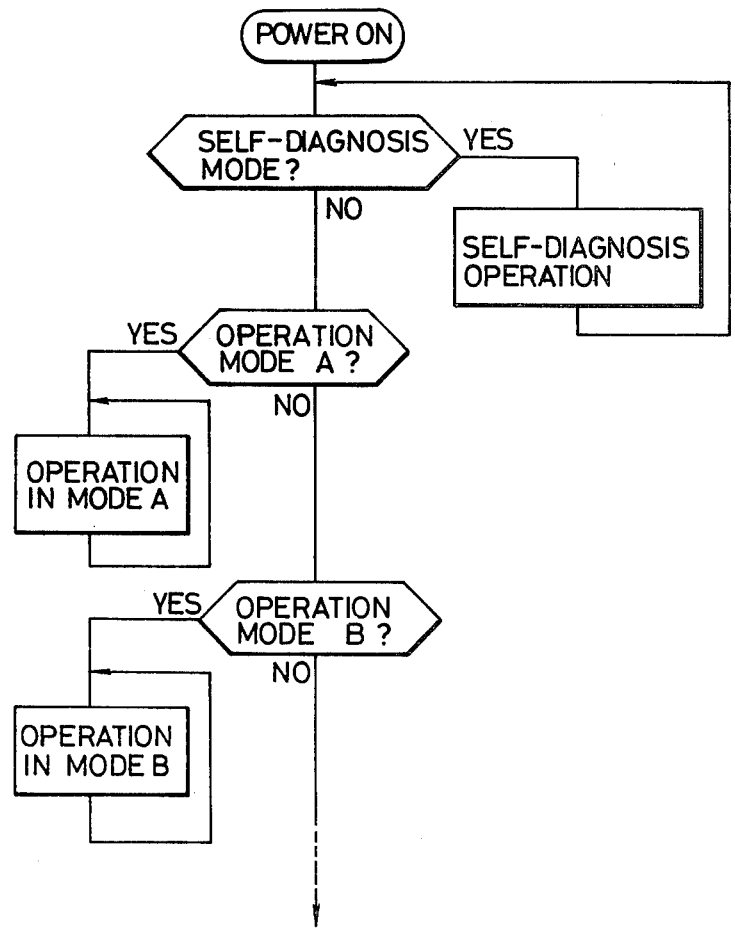
FIG. 4 is a flow chart for describing the operation of an FDD according to the invention.

In FIG. 3, reference numeral 12 designates a program memory section which includes a plurality of programs for determining the operation of an FDD according to the invention; 13, a CPU section for operating a mechanism section according to the programs stored in the program memory section 12; and 14, an I/O section for inputting and outputting signals in response to instruction signals from the CPU section 13. Connected to the I/O section 14 are a host computer (or an FDD controller) 1, a head 4, which is the mechanism section of the FDD, a step motor 5, a head load actuator 6, a door lock actuator 8, a write protect detector 9, a track "00" signal detector 10, and an index signal detector 11. Furthermore, a mode set switch 15 is connected to the I/O section 14, which provides switch signals to determine a plurality of operation modes.

The operation of the embodiment thus organized will be described with reference to a flow chart shown in FIG. 4.

Before the FDD is operated after the power switch is turned on, the CPU section 13 reads and interprets the operation pattern of the mode set switch 15, i.e., a switch signal train, to detect the operation mode which has been selected by the operator. Then, the CPU section reads a program corresponding to the operation mode thus detected out of the program memory section 12, and operates the mechanism section of the FDD according to the program thus read. If the data set switch 15 connected to the I/O section 14 is set to the self-diagnosis mode when the operation mode is read, a self-daignosis operation is carried out. That is, the data set switch 15 provides an instruction signal, and an operation corresponding to the instruction signal is read, whereby the FDD is operated by itself, without the aid of the host computer 1. On the other hand, if the data set switch 15 is set to an ordinary data operation mode, the operation sequence of the mechanism section or electrical signals in the mechanism section, and the logic of the interface of the mechanism section can be changed according to a program corresponding to an input signal of the data set switch 15.

In the above-described embodiment, the data set switch 15 is employed as operation mode input means; however, command signals may be delivered through the interface signal terminals of the host computer 1. In this case, it is necessary to provide a signal for switching the command input mode and the interface signal.

Instead of a floppy disk, a hard disk may be used with equivalent effect.

As is apparent from the above description, according to the invention, the FDD is so designed that the electronic control section is operated according to the programs stored in the memory section. Therefore, the FDD can select the operation modes suitable for various uses by itself, and carry out self-diagnosis.

What is claimed is:

1. A disk drive comprising:
    a disk capable of sorting data;
    a mechanism section for writing data onto said disk and reading data out of said disk;
    an I/O section arranged in a signal path between said mechanism and a host computer, for inputting and outputting signals;
    a program memory section having stored therein programs corresponding to a plurality of data operation modes of said mechanism section;
    a mode set switch independent of said host computer for applying said plurality of data operation modes to said I/O section through switch signals; and
    a CPU section for interpretting a data operation mode inputted by said mode set switch, reading a program corresponding to said operation mode thus interpreted out of said program memory section, and operating said mechanism section according to said program thus read.

2. A disk drive as claimed in claim 1, wherein said program memory section has stored therein a program corresponding to a self-diagnostic mode of said mechanism section, whereby the disk drive may be operated independently of said host computer for self-diagnosis, according to said self-diagnostic program.

3. A disk drive as claimed in claim 2, wherein said disk is a floppy disk rotated by means of a drive motor, said disk drive further including a read/write head operable in a plurality of modes depending upon the operation of said mode set switch.

4. A floppy disk drive with local processor control for controlling a read/write head operating on a disk drive under the control of a host computer, comprising:
    mechanical means for controlling the rotation operation of said floppy disk and the position of said read/write head capable of writing data onto said floppy disk and reading the data from said floppy disk; and
    electronic control means for controlling the operation of said mechanical means in response to control signals from said host computer to control the data communication between said host computer and said floppy disk through said read/write head, said electronic control means comprising:
    an I/O section arranged in a signal path between said mechanical means and said host computer, for inputting and outputting signals;
    a program memory section having stored therein programs corresponding to a plurality of operation modes of said mechanical means, said operation modes including a self-diatnostic mode;
    a mode set switch section capable of applying the plurality of operation mode signals to said I/O section; and
    a CPU section for interpreting an operation mode signal inputted by said mode set switch section, reading a program corresponding to said operation mode signal thus interpreted out of said program memory section, and operating said mechanical means according to said program thus read, said electronic control means operating to control said mechanism means independent of said host computer.

* * * * *